US012710159B2

(12) United States Patent
Garcia van de groote Poort

(10) Patent No.: US 12,710,159 B2
(45) Date of Patent: Aug. 18, 2026

(54) SPOTLIGHT, FILTER FOR A SPOTLIGHT AND SYSTEM OF SPOTLIGHT AND FILTER WITH SMART GLASS

(71) Applicant: ROXX GmbH, Cologne (DE)

(72) Inventor: Daniel Garcia van de groote Poort, Kerpen (DE)

(73) Assignee: ROXX GmbH, Cologne (DE)

( * ) Notice: Subject to any disclaimer, the term of this patent is extended or adjusted under 35 U.S.C. 154(b) by 0 days.

(21) Appl. No.: 19/435,303

(22) Filed: Dec. 29, 2025

(65) Prior Publication Data

US 2026/0126165 A1 May 7, 2026

Related U.S. Application Data

(62) Division of application No. 19/039,521, filed on Jan. 28, 2025.

(30) Foreign Application Priority Data

Aug. 28, 2024 (DE) ......................... 202024104851.2
Nov. 12, 2024 (DE) ......................... 202024106523.9

(51) Int. Cl.
*F21V 14/00* (2018.01)
*F21V 14/06* (2006.01)

(52) U.S. Cl.
CPC ............ *F21V 14/003* (2013.01); *F21V 14/06* (2013.01)

(58) Field of Classification Search
CPC ............................ F21V 14/003; F21V 17/005
See application file for complete search history.

(56) References Cited

U.S. PATENT DOCUMENTS

| | | | | |
|---|---|---|---|---|
| 2007/0188873 A1* | 8/2007 | Wardas | .................. | A47F 3/005 359/609 |
| 2010/0195322 A1* | 8/2010 | Kawakami | ................ | F21S 2/00 362/231 |
| 2011/0170296 A1 | 7/2011 | Heise | | |
| 2014/0362580 A1 | 12/2014 | Jonsson | | |

FOREIGN PATENT DOCUMENTS

| | | |
|---|---|---|
| CN | 102937258 B | 5/2015 |
| DE | 20016303 U1 | 2/2001 |
| DE | 102011050163 A1 | 11/2012 |
| DE | 202021106292 U1 | 11/2021 |
| DE | 202024104851 | 10/2024 |
| EP | 3052858 B1 | 4/2018 |
| EP | 3779273 B1 | 2/2021 |

OTHER PUBLICATIONS

Search Reports of the European Patent Office dated Jun. 16, 2025 with respect to European patent application EP 25150061.7.
Search Reports of the European Patent Office dated Jul. 1, 2025 with respect to European patent application EP 25150066.6.
Office Action dated Jan. 8, 2026 issued in corresponding U.S. Appl. No. 19/039,521.

* cited by examiner

*Primary Examiner* — Sean P Gramling
(74) *Attorney, Agent, or Firm* — COZEN O'CONNOR

(57) ABSTRACT

A spotlight, having a housing. The housing defines a cavity and a light exiting side of the spotlight. The spotlight has a light element provided in the cavity of the housing; a zoom optic provided in the cavity of the housing; and a filter arranged at the light exiting side on the housing. The filter has a tintable glazing (Smart Glass), wherein the translucency of the glazing is changeable by application of an electric voltage.

7 Claims, 7 Drawing Sheets

SPOTLIGHT, FILTER FOR A SPOTLIGHT AND SYSTEM OF SPOTLIGHT AND FILTER WITH SMART GLASS

CROSS REFERENCE TO RELATED APPLICATIONS

This application is a divisional of U.S. patent application Ser. No. 19/039,521 which was filed with the U.S. Patent and Trademark Office on Jan. 28, 2025. Priority is claimed for this invention and corresponding application(s) having been filed in Germany on Nov. 12, 2024, No. 202024106523.9 and; Germany on Aug. 28, 2024, No. 202024104851.2, respectively.

BACKGROUND OF THE INVENTION

1. Field of the Invention

The invention refers to a spotlight for professional illumination applications, e.g. for professional event illumination. Further, the invention refers to a filter, in particular an optical filter, having a variably tintable or frosted, respectively, glazing (also known as Smart Glass), which can be continuously translucent colored or opaque colored, a spotlight, on which the filter is removably mountable, as well as a system of the filter and spotlight according to the invention.

2. Description of the Related Art

Spotlights for event technology, such as PAR (Parabolic Aluminized Reflector), floodlights, Fresnel or profile spotlights and strobes are well known. Furthermore, it is known to provide such spotlights with elements for generating optical effects in a non-detachable or detachable manner. Such elements for the generation of optical effects are, e.g., as disclosed in DE 20 2024 104 851 U1, filter having a tintable or frosted glazing, wherein the translucency is changeable in response to the application of an electric voltage. Such so-called Smart Glass filters are adjustable to be continuously translucent or opaque colored and/or to be continuously colored.

Even though such elements for the generation of optical effects allow for the provision of different illumination effects, the flexibility thereof for the generation of illumination effects is limited, though, because during operation effects can only generated by the application of voltage or not. Alternatively, the filter has to be replaced by another type of filter or optical element during operation, which is cumbersome. Furthermore, it is known to fixedly attach filters to conventional spotlights, wherein the filters. have a tintable glazing, wherein the translucency is changeable in response to the application of an electric voltage. The spotlights do not comprise further optical elements. Such fixed filters cannot be exchanged or replaced, at best only with much effort, such that the variety of optical effects which are achievable is limited.

SUMMARY OF THE INVENTION

Based on this it is an object of the invention to provide a spotlight which allows to utilize the effects of a Smart Glass filter on a spotlight in a plurality of ways and to achieve a greater variability of illumination effects without changing the filters during operation. Further, it is an object to provide a corresponding exchangeable filter and a system of a spotlight and an exchangeable filter.

Disclosure of the Invention

The invention is based on the idea of combining an optical filter which is formed of a tintable glazing, a so-called Smart Glass, with a zoom optic of a spotlight, such that a plurality of effects of the light emitted by the spotlight can be achieved by the continuously adjustable Smart Glass in combination with the zoom optic and the possible combinations and therefore effects are multiplied compared to conventional spotlights. Because both the zoom optic is adjustable during operation of the spotlight and the Smart Glass is adjustable during operation, these effects can be employed and achieved flexibly at any time, without the need to change filter elements or other optic elements.

The Smart Glass Filter is detachably or fixedly (non-detachably) mounted to the spotlight. If, preferably, the filter is detachably mounted to the spotlight, the Smart Glass filter may be exchanged with another filter or with another Smart Glass filter or with another optical element, if needed, which allows for even more flexibility regarding the illumination effects achievable with the spotlight, and, thus, the application of the spotlight.

A preferred embodiment for the detachable mounting of a Smart Glass Filter to a spotlight is disclosed in DE 20 2024 104 851 U1, the teaching of which regarding the detachable mounting are herewith enclosed by reference.

In particular, in case of detachable filters and for ensuring the correct mounting of the filter, at least four contacts are preferably provided on a frame of the filter, to which the tintable glazing is attached. Electric voltage for changing the translucency of the tintable glazing is applied via at least two of these contacts, and at least two different contacts ensure that the mounting of the filter to the spotlight, which is provided with corresponding contacts, is correct. The contacts may be provided in a row next to each other; alternatively, however, at least two of the at least four contacts can be arranged in pairs next to each other in a row.

According to a preferred embodiment, the zoom optic comprises at least one optical element which is adjustable regarding its position and/or orientation. The at least one optical element is arranged between the light elements of the spotlight and the light exiting side or face, respectively, of the spotlight. According to a further preferred embodiment, the at least one optical element is translationally movable in a direction which is substantially perpendicular to the light exiting side or face, respectively, of the spotlight, such that it may be arranged closer to and more distant from the light elements and the light exiting side. Thus, continuously adjustable illumination effects can be achieved.

For example, the optical element may comprise one or more lenses.

The adjustment of the at least one optical element may, e.g., be achieved by means of an adjustment motor which, e.g., moves the optical element translationally. Alternatively, it is also possible to rotate or tilt the optical element. Using an adjustment motor allows for an easy and reliable movement and adjustment of the optical element.

Preferably, the zoom optic comprises multiple optical elements, e.g. optical elements which are assigned to the individual light elements of the spotlight, such that light exiting from a group of light elements passes through one of the optical elements for reaching the light exiting side of the spotlight.

When a plurality of optical elements are provided, these are preferably provided on a common holder, such that the optical elements are adjustable together regarding their position and/or orientation by adjusting the holder. Accordingly, only one common adjustment motor is needed for the entire zoom optic, which reduces the complexity of the arrangement.

A light guide is preferably assigned to each one of the optical elements as light element. Accordingly, the light emitted from the light elements can be guided as a bundle into the optical element.

The light elements can comprise any type of light elements or can be combinations of different light elements, and can comprise, e.g., LEDs and/or light guides.

The plurality of light elements are preferably arranged on a common printed circuit board (PCB) for reducing the complexity.

A preferred embodiment for the detachable mounting of a Smart Glass Filter to a spotlight is disclosed in the following and can also be applied to detachable Smart Glass Filters at any type of spotlight, including such without additional zoom-optic. This is based on the idea of attaching an optical filter, which is formed of a tintable glazing, a so-called Smart Glass, in a detachable manner at a spotlight and to ensure thereby that the filter is mounted to the spotlight correctly oriented and positioned. The filter can be fixed to the housing by, e.g., clamping connectors or magnetic connectors, such that exchanging of the filter is facilitated.

In particular, in case of detachable filters and for ensuring the correct mounting of the filter, at least four contacts are preferably provided on a frame of the filter, to which the tintable glazing is attached. Electric voltage for changing the translucency of the tintable glazing is applied via at least two of these contacts, and at least two different contacts ensure that the mounting of the filter to the spotlight, which is provided with corresponding contacts, is correct. The contacts may be provided in a row next to each other; alternatively, however, at least two of the at least four contacts can be arranged in pairs next to each other in a row.

For ensuring the detachable filter being mounted correctly oriented and positioned, the filter comprises at least four contacts, which are provided on a frame to which the tintable glazing is fixed. Electric voltage for changing the translucency of the tintable glazing is applied via at least two of these contacts, and at least two different contacts ensure that the mounting of the filter to the spotlight is correct.

According to an embodiment, the at least four contacts are provided in a row next to each other; alternatively, however, at least two of the at least four contacts can be arranged in pairs next to each other in a row. The frame of the filter to which the tintable glazing is fixed has at least one frame member, according to an embodiment, wherein the at least four contacts are arranged in a row or in pairs along a row on one of the frame members.

According to another embodiment, the frame of the detachable filter, to which the tintable glazing is fixed, comprises a plurality of frame members, wherein the at least four contacts are distributed onto different frame members in a row or in pairs along a row. This allows to provide the at least four contacts in a suitable manner on the frame, for ensuring that the tintable glazing is supplied with a corresponding electric voltage for changing the translucency on the one hand, and to ensure that the filter is correctly mounted to the frame of the spotlight, on the other hand.

The voltage necessary for changing the translucency of the tintable glazing is preferably supplied by the spotlight to which the filter is attached. In particular, this voltage is supplied to two of the at least four contacts of the filter, if it is detected by means of the other contacts of the filter, which do not serve for the supply of the voltage, that the filter is correctly positioned and oriented on the housing of the spotlight. As mentioned above, the detachable filter can be held in the correct mounting position on the housing of the spotlight by means of clamping connections and/or magnetic connections in an easy manner.

According to an embodiment of the invention, at least two of the at least four contacts are pro-vided for the detection of the correct position and orientation of the filter when mounting the filter to a spotlight, wherein these contacts are electric and/or optic contacts. When using electric contacts, e.g. a circuit can be closed, when these contacts come into contact with complementary contacts on the housing of the spotlight.

The spotlight according to the invention, to which the above mentioned detachable filter can be attached in a correct orientation and position, comprises a housing, to which the filter is fixed, a light element provided in a cavity of the housing, a front face which closes the cavity at the light exiting side of the spotlight, and a connecting portion provided at the housing at the light exiting side for detachably mounting of one or more of the above mentioned filters according to the invention.

According to an embodiment, the connecting portion has at least four contacts which are formed complementarily to the above mentioned four contacts of the one filter or the plurality of filters regarding position and function. Electric voltage can be supplied via at least two of these contacts to the mounted filter, with which the translucency of the tintable glazing can be adjusted. The at least two other contacts allow the detection of the correct orientation and position of the filter on the housing of the spotlight. In particular, the electric voltage for changing the translucency of the filter is only supplied from the spotlight, if the filter is mounted correctly oriented and positioned.

In one embodiment, the correctly oriented and positioned mounting of the filter according to the invention to the housing of the spotlight is ensured by binging the at least two contacts of the filter, which do not serve for changing the translucency of the filter, with the complementary at least two contacts of the spotlight in contact to close an electric circuit or an optic circuit, respectively.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, the invention is described by way of example of preferred embodiment with reference to the attached figures. The figures show.

DETAILED DESCRIPTION OF THE DISCLOSED EMBODIMENTS

Figure 1:
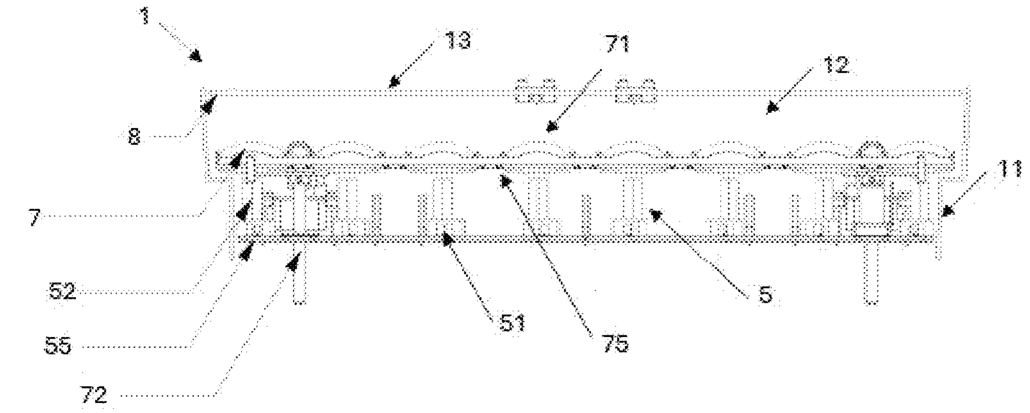
FIG. 1: a sectional view of a spotlight with a filter with a tintable glazing (Smart Glass) and a zoom optic according to an embodiment, wherein the zoom optic is in a first position.

FIG. 1 shows a sectional view of a spotlight 1. The spotlight 1 comprises a housing 11 which defines a cavity 12. The housing 11, for example, be essentially cuboid or alternatively cylindrical or have any other suitable shape.

Light elements 5 are provided in the cavity 12 of the spotlight 1. The light elements 5 are arranged on a printed circuit board PCB 55 in the embodiment shown. Several groups of LEDs 51 and light guides 52 are provided as light elements 5, which emit light in a direction of a light exiting side 13 of the spotlight in operation.

A Smart Glass filter 8 is provided at the light exiting side 13 of the spotlight 1. The Smart Glass filter 8 may be fixedly connected with the housing of the spotlight 1 or may be provided detachably to the housing, and thus exchangeable with another Smart Glass filter or another type of optical element. The translucency properties of the Smart Glass, as, e.g. depending on the type of the Smart Glass its color, transparency, frosting-effect etc. are changeable and adjustable upon application of an electric voltage to the Smart Glass.

Further, additional optical elements, like e.g. additional filters, can be provided to the spotlight 1.

Before exiting the cavity 12 of the spotlight and passing through the Smart Glass filter 8, the light emitted from the light elements 5 passes through a zoom optic 7 which is also provided in the cavity 12 of the spotlight. The zoom optic 7 comprises a plurality of lenses 71 which are arranged on or at a common holder 75. One single lens or a plurality of lenses, wherein the plurality of lenses may be integrally formed, i.e. formed of a single piece of material, may be provided. Because the lenses 71 are provided on a common holder 75 in the embodiment shown, they can be moved together by means of a common adjustment motor 72 and a corresponding adjustment mechanism.

Figure 2:
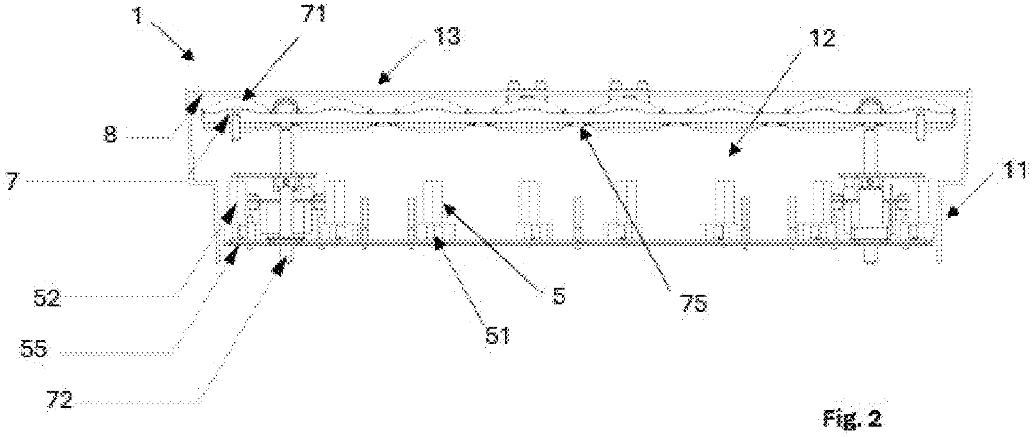
FIG. 2: a sectional view of the spotlight of FIG. 1, wherein the zoom optic is in a second position.

In the embodiment shown in FIG. 1 and FIG. 2, the holder 75 is translationally movable, i.e. essentially along the light exiting direction out of the spotlight 1, by operating the adjustment motor 72. In the embodiment shown, the holder 75 and together with the holder 75 the lenses 71 attached thereto can be translationally moved from a position close to the printed circuit board 55 or board, and thus close to the light elements 5, (shown in FIG. 1) into a position distant to the printed circuit board 55 or board, and thus distant to the light elements 5, which is shown in FIG. 2 and in which the lenses 71 are close to the Smart Glass filter 8.

By means of the different position of the lenses 71 with respect to the light elements, already diverse illumination effects can be achieved at a particular translucency property of the Smart Glass filter 8. Because, however, the translucency properties of the Smart Glass filter 8 can additionally be changed by the application of electric voltage to the Smart Glass filter 8, an even greater diversity and flexibility for the adjustment of illumination effects results.

Figure 3:
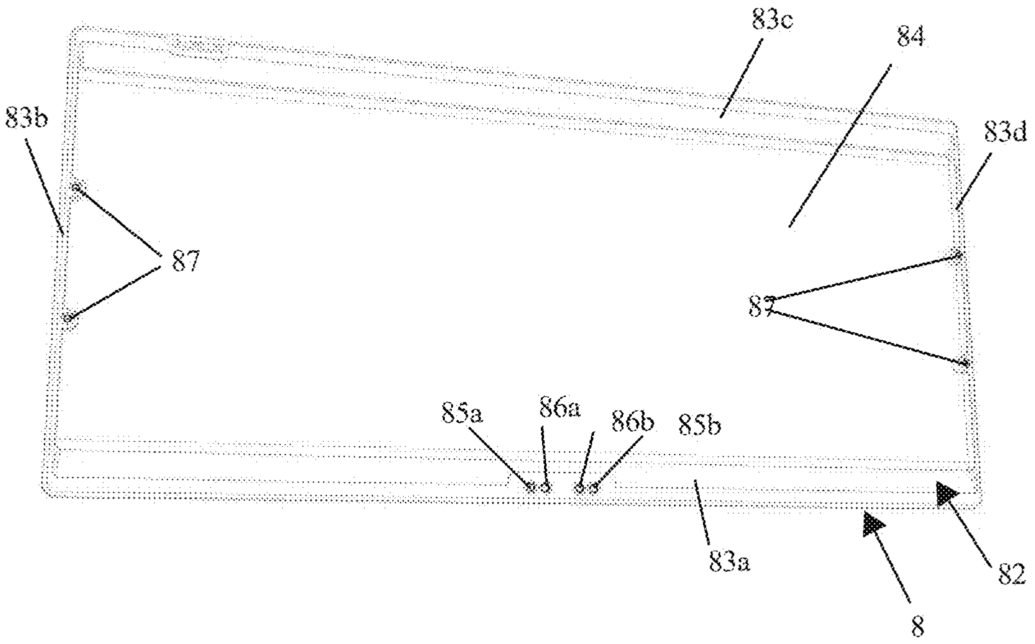
FIG. 3: a perspective view of a detachable filter having a tintable glazing (Smart Glass)
Figure 8:
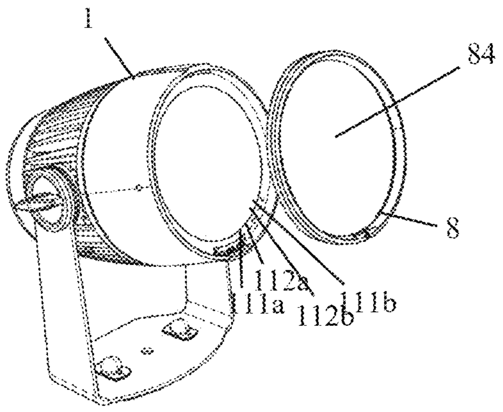
FIG. 8: an embodiment of a system according to the invention with a filter detached from a spotlight.

FIG. 3 shows a perspective view of an embodiment of a detachable filter 8, comprising a frame 82 which has four frame members 83*a*, 83*b*, 83*c*, 83*d* according to this embodiment. According to this embodiment of the frame 82, the frame members 83*a*, 83*b*, 83*c*, 83*d* are correspondingly connected to each other to form a substantially rectangular filter, wherein a tintable glazing (Smart Glass) 84 is framed between the frame members 83*a*, 83*b*, 83*c*, 83*d*. FIG. 8 shows an alternative embodiment of a detachable round filter with a round frame member into which a tintable glazing is framed, as will be described later.

As shown in FIG. 3, the filter 8 comprises four contacts 85*a*, 85*b*, 86*a*, 86*b* in this embodiment, wherein electric voltage is supplied to the filter 8 via the contacts 85*a*, 85*b*, for changing the translucency of the tintable glazing 84. The contacts 86*a*, 86*b* serve for ensuring a correct orientation and position of the filter 8 upon attachment to a spotlight 1 as shown in FIG. 4.

As is further shown in FIG. 3, filter 8 comprises attaching means 87 which are provided at the frame members 83*b* and 83*d* according to this embodiment. Alternatively, these attaching means 87 can be provided in addition or alternatively at the frame members 83*a* and 83*c*. For an easy mounting of the filter, these attaching means 87 are, e.g., a clamping connection and/or a magnetic connection, such that the filter 8 can easily be attached to a spotlight 1 and detached therefrom.

Figure 4:
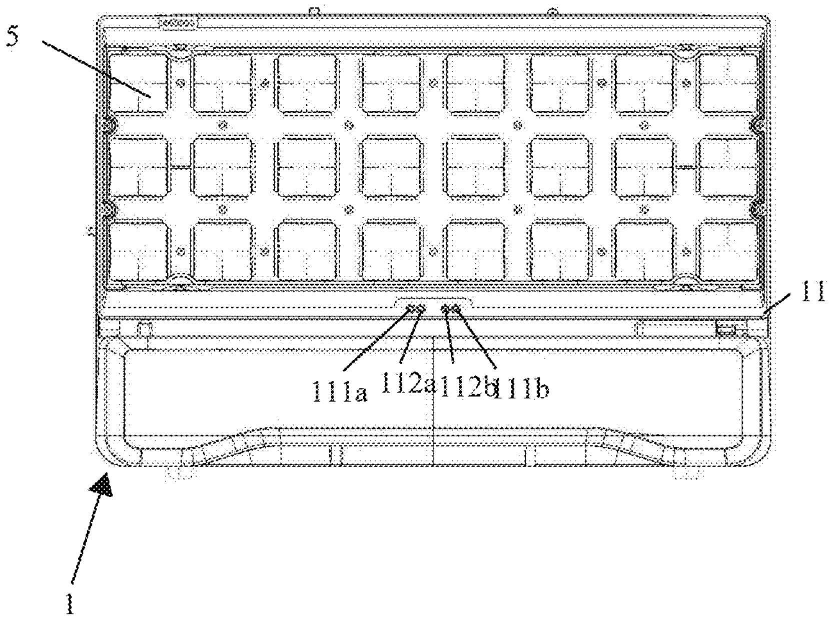
FIG. 4: a schematic view of a spotlight, to which the filter according to FIG. 3 can be attached and mounted in a correct position and orientation.

FIG. 4 shows an embodiment of a spotlight 1 according to the invention to which an detachable filter 8 can be attached. The spotlight 1 comprises a housing 11 and a light element 5 provided in a cavity 12 of the housing 11. FIG. 4 further shows a connecting portion provided on housing 11 at the light exiting side 13 for detachably mounting of one or more filters 8 shown in FIG. 3. The connecting portion of the spotlight 1 is located at a front face of the spotlight closing the cavity 12 at the light exiting side 13 of the spotlight 1, according to this embodiment. The connecting portion further comprises at least four contacts 111*a*, 111*b*, 112*a*, 112*b*, which are complementary to the contacts 85*a*, 85*b*, 86*a*, 86*b* of the filter 8 of FIG. 3 regarding their function and position.

According to spotlight 1 shown in FIG. 4 the contacts 111*a*, 111*b* serve for supplying a corresponding electric voltage to the filter 8 on touch with the contacts 85*a*, 85*b* of the filter 8 for changing the translucency of the tintable glazing 84. According to the invention, electric voltage is only delivered when the contacts 112*a*, 112*b* of the spotlight 1 are contacting the contacts 86*a*, 86*b* of the filter 8, such that it is ensured that the filter is mounted in a correct position and orientation on the spotlight 1.

According to a preferred embodiment the spotlight 1 is suitable for delivering the electric voltage to filter 8 via the contacts 111*a*, 111*b*, for changing the translucency of the tintable glazing 84 without the need to provide a separate power supply source for the filter 8.

Even though not shown in FIG. 4, the housing 11 of the spotlight 1 has corresponding attaching means in the connecting portion, which are complementary to the attaching means 87 of the filter 8 of FIG. 3, for fixing the filter to the spotlight 1 in a detachable manner upon correct positioning and orientation of the filter 8.

Figure 5:
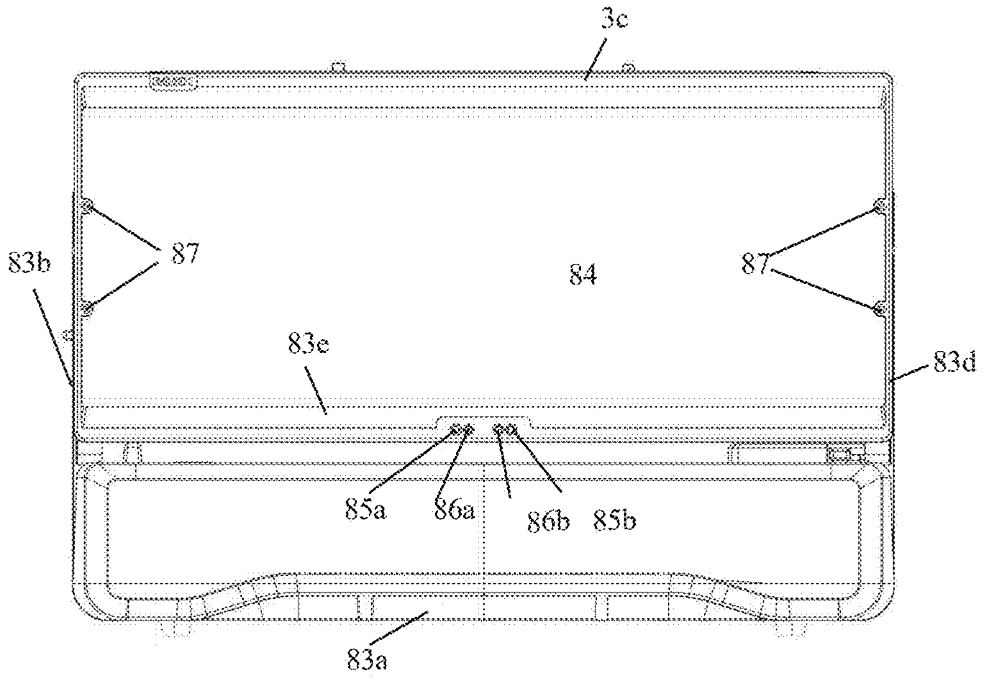
FIG. 5: a frame of the filter of FIG. 3 in an alternative embodiment.

FIG. 5 shows another embodiment of frame 82 of the detachable filter shown in FIG. 3, wherein a further frame member 83*e* is provided. According to this embodiment, the frame member 83*e* is arranged between the frame members 83*a* and 83*c* and in parallel with these, and is configured to comprise the contacts 85*a*, 85*b*, 86*a*, 86*b*. The function of these contacts is the same as described with reference to FIG. 3.

According to the embodiment shown in FIG. 5, the tintable glazing 84 is provided in the area between the frame members 83*e*, 83*b*, 83*c* and 83*d*, and the frame member 83*a* mainly serves as foot, with a void between frame members 83*a* and 83*e*. Alternatively, several tintable glazings may be provided. Such several tintable glazings can be supplied with an electric voltage via the same contacts 85*a*, 85*b*, for example, and the tintable glazings may have different translucencies at the same electric voltage, respectively. Any number of frame members with different orientations with respect to each other can be provided.

Figure 6:
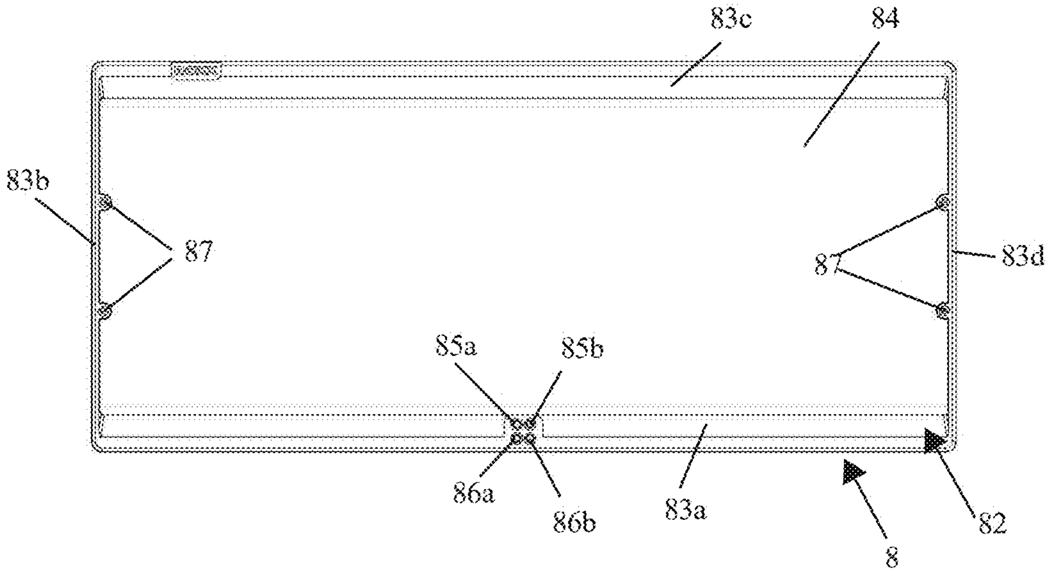
FIG. 6: a partial view of a frame member of the filter according to the invention having an arrangement of contacts according to a first embodiment.

According to the filters shown in FIG. 3 and FIG. 5 the contacts 85*a*, 85*b* and 86*a*, 86*b* are arranged in a row on a frame member. Alternatively, according to another embodiment, at least two of the four contacts can be arranged in pairs next to each other in a row, as it is shown in FIG. 6. Even though only four contacts are shown in the figures, more than four contacts may be used, wherein preferably two of these contacts are suitable for delivering the electric voltage for changing the translucency of the tintable glazing, and the other contacts are used for ensuing a correct orientation and position of the filter upon mounting to a spotlight.

In FIGS. 3, 5 and 6 the contacts 85*a*, 85*b* and 86*a*, 86*b* are provided on one single frame member of the frame members. According to another embodiment, the contacts can also be distributed to different frame members, as it is shown in FIG. 7.

Figure 7:
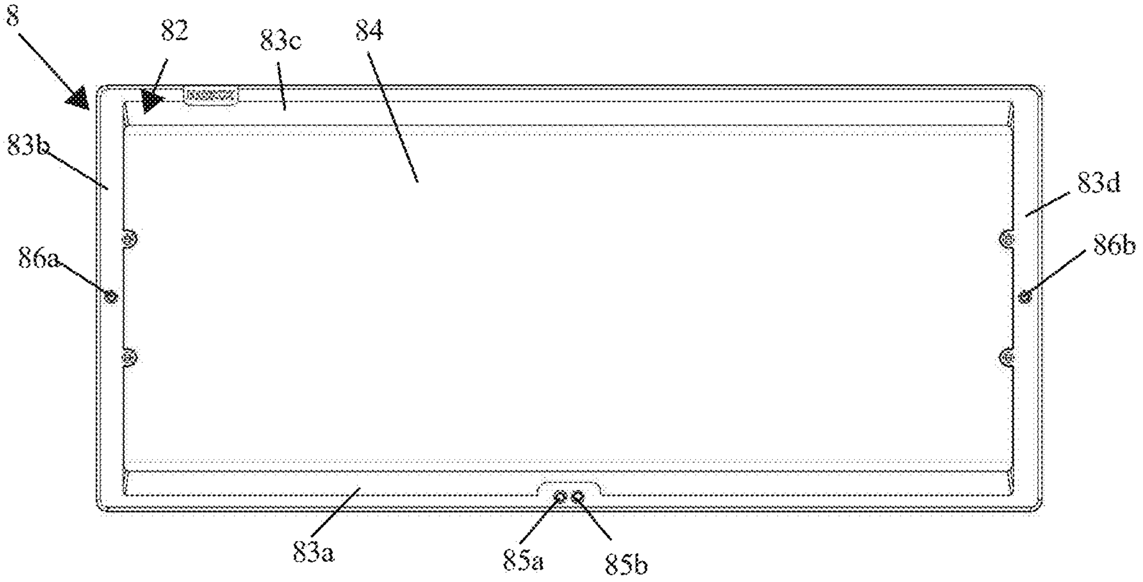
FIG. 7: a frame of the filter having an arrangement of contacts according to a second embodiment.

FIG. 7 shows the contacts 85*a*, 85*b* which serve for supply of the electric voltage for changing the translucency of the tintable glazing on the frame member 83*a*, the contact 86*a* on the frame member 83*b* and the contact 86*b* on the frame member 83*d* which is opposite to the frame member 83*b*. Any distribution of contacts 85*a*, 85*b* and 86*a*, 86*b* on the frame is possible according to the invention.

FIG. 8 shows an embodiment of a system of a spotlight 1 and a filter 8. Other than the filter 8 shown in FIG. 3 and the spotlight 1 shown in FIG. 1 or FIG. 4, the frame of the filter 8 and the housing of the spotlight 1 are formed round. The tintable glazing 84 is similarly framed in the round filter 8, and the filter 8 can be fitted precisely onto the round front face of the spotlight 1.

Similar to the spotlight 1 shown in FIG. 4, the spotlight 1 according to FIG. 8 comprises a connecting portion for detachably fixing the filter 8, wherein the connecting portion has four contacts 85*a*, 85*b* and 86*a*, 86*b*, which are complementary to corresponding contacts (not shown in FIG. 8, as directed to the front face of the spotlight 1) formed on the frame of the filter 8 regarding their position and function, similar to the spotlight 1 of FIG. 4.

In a similar manner as the spotlight 1, the spotlight 1 of FIG. 8 supplies an electric voltage via the contacts 111*a*, 111*b*, wherein the electric voltage is suitable for changing the translucency of the tintable glazing 84 of the filter 8. Similarly, as described above, the contacts 112*a*, 112*b* serve for ensuring a correct position and orientation of the filter 8 when mounting to the housing of the spotlight 1.

The spotlight 1 and the filter 8 of FIG. 8 differ from the spotlight 1 of FIG. 4 and the filter 8 of FIG. 3 essentially only in respect of shape, but not in respect of function regarding mounting and correct orientation and position. Both the spotlight 1 of FIG. 8 and the spotlight 1 of FIG. 4 may be provided with a zoom optic as described with respect to the spotlight 1 of FIG. 1.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A filter with a tintable glazing (Smart Glass), the translucency of the glazing being changeable by applying an electric voltage, the filter comprising:

a frame to which the tintable glazing is fixed, and at least four contacts provided on the frame, wherein the electric voltage for changing the translucency can be supplied via at least two of the at least four contacts, and a correct orientation and position of the filter upon mounting to a spotlight is detectable using at least two different contacts of the at least four contacts.

2. The filter according to claim 1, wherein the at least four contacts are arranged next to each other in a row.

3. The filter according to claim 1, wherein at least two of the at least four contacts are arranged in pairs next to each other in a row.

4. The filter according to claim 1, wherein the frame comprises at least one frame member and the at least four contacts are arranged on one of the frame members.

5. The filter according to claim 1, wherein the frame comprises a plurality of frame members and the at least four contacts are distributed on different frame members.

6. The filter according to claim 1, wherein the at least two different contacts of the at least four contacts for detection of the correct position and orientation of the filter when mounting to a spotlight are electric and/or optic contacts.

7. A spotlight with a housing, a light element provided in a cavity of the housing, a front face closing the cavity at the light exiting side of the spotlight, and a connecting portion provided at the housing at the light exiting side for detachably fixing of one or a plurality of filters according to claim 1, wherein the connecting portion comprises at least four contacts which are complementary to the at least four contacts of the one filter or the plurality of filters, respectively, with respect to their position and function, an electric voltage is deliverable via at least two of the at least four contacts which serves for changing the translucency of a filter attached to the spotlight, and a correct orientation and position of the filter upon mounting to the housing of the spotlight is detectable via the at least two different of the at least four contacts.

* * * * *